March 29, 1966   R. SAMER   3,243,206
FITTING FOR CONNECTING PLIABLE CONDUIT TO APERTURED MEMBER
Filed Dec. 30, 1963
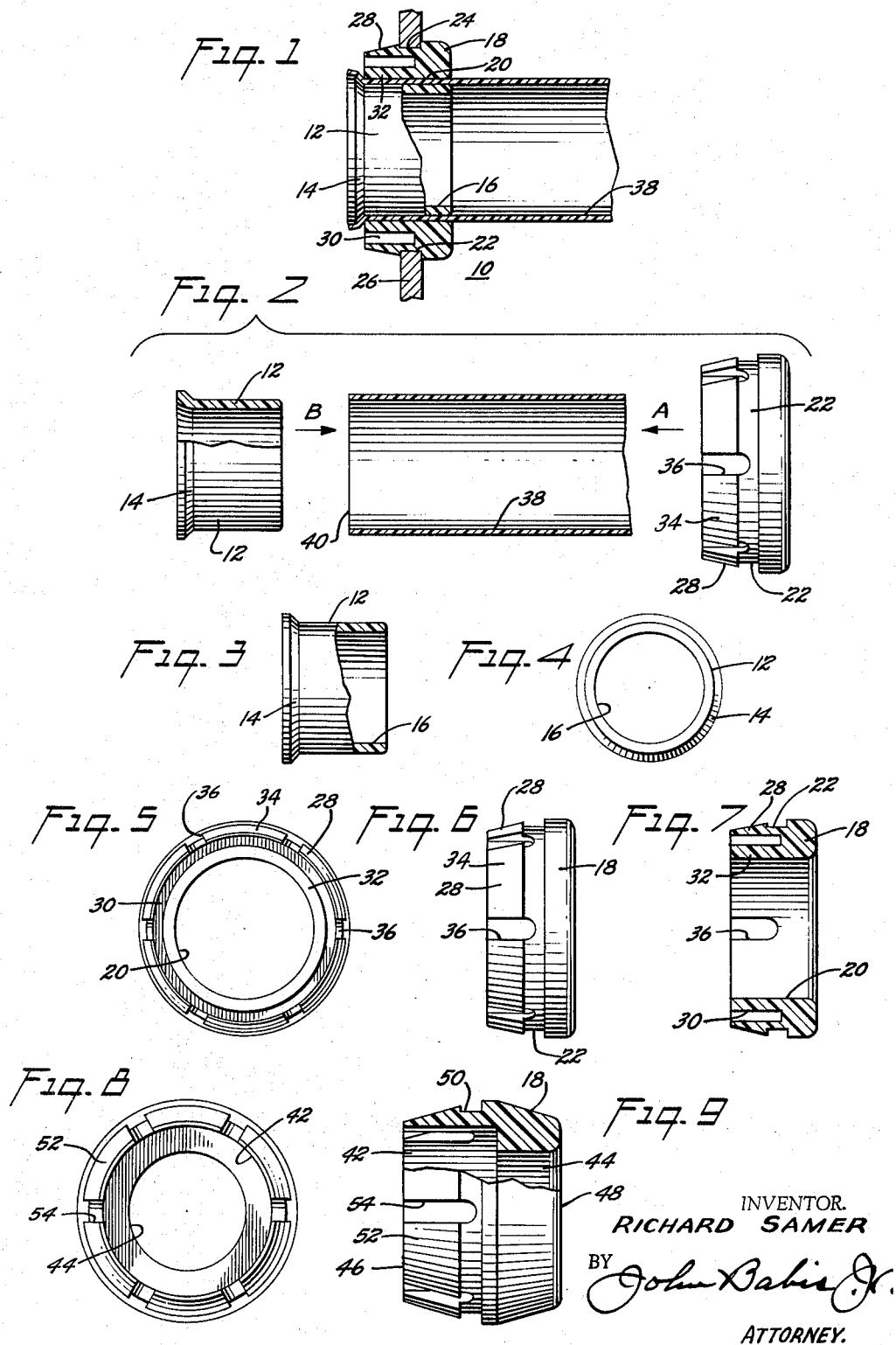
INVENTOR.
RICHARD SAMER
BY
ATTORNEY.

United States Patent Office 3,243,206
Patented Mar. 29, 1966

3,243,206
FITTING FOR CONNECTING PLIABLE CONDUIT
TO APERTURED MEMBER
Richard Samer, Elizabeth, N.J., assignor to The Thomas
& Betts Co., Incorporated, Elizabeth, N.J., a corporation of New Jersey
Filed Dec. 30, 1963, Ser. No. 334,404
1 Claim. (Cl. 285—162)

The present invention relates to electrical raceway connector fittings and more particularly to connector fittings of the type utilizable for securing an end of a pliable tubular conduit in a suitable opening in a chassis, frame, panel or the like whereby insulated wire conductors may extend through said conduit and said opening in a neat, flexible non-exposed manner.

More specifically, the invention resides in a polyamide plastic connector fitting comprising a male and female member adapted to be initially assembled in telescoped relation with a pliable plastic conduit or hose-like end portion in concentric relation therebetween, the entire assembly being adapted to be forced into a suitable opening in a panel or the like until the outer or female member snaps into locked engagement with the peripheral edge defining the opening in said panel after the fashion of a grommet.

The present invention is particularly concerned with the provision of an improved fitting or coupling adapted for securing and supporting a pliable conduit or hose-like member in an opening provided therefor in a panel or the like in a positive sealed manner with a minimum of difficulty of assembly and with a maximum degree of security when in place.

Accordingly, it is an object of the invention to provide a yieldable fitting of the character described which is adapted for readily terminating an end portion of a tubular conduit or hose-like member of flexible plastic, in an opening, provided therefor in a panel or the like, without damage to or elongation of the conduit.

A further object of the invention is to provide a pliable plastic conduit or electrical raceway connector of the character described which does not pinch wire conductors within a conduit when drawn therethrough.

Another object of the invention is to provide a connector of the character described which is readily assembled with a tubular conduit of flexible plastic therebetween and the assembly readily snapped into place in a panel opening.

A further object of the invention is to provide a two-part connector fitting which is adapted to be assembled in telescopic relation with an end portion of a pliable, plastic, tubular conduit therebetween, wherein one part of said fitting is provided with relatively flexible peripheral portions adapted to be readily inserted and snapped into a predetermined position in an opening in a panel or the like without distending the remainder of the assembled fitting.

With the above and other objects in view, the invention resides in the novel construction, and arrangement of parts, the novel features of which are set forth with particularity in the appended claims, the invention itself, however, both as to its organization and method of operation, together with additional objects and advantages thereof, being best understood from the following description of a specific embodiment thereof, when considered in conjunction with the accompanying drawing in which:

FIGURE 1 is a longitudinal sectional view partly in elevation showing the improved two-part connector as assembled in telescopic relation with an end portion of a tubular conduit of pliable plastic secured therebetween, and as secured in an opening provided therefor in a panel or the like;

FIGURE 2 is an exploded view showing the elements of the assembly of FIGURE 1, in their order of assembly in two steps as indicated by the arrows;

FIGURE 3 is a view in elevation partly in section of the inner sleeve element of the assembly in FIGURE 1;
FIGURE 4 is an end view of the same;
FIGURE 5 is an end view of the outer bushing element of the assembly in FIGURE 1;
FIGURE 6 is a view in side elevation of the same;
FIGURE 7 is a longitudinal section view of the same;
FIGURE 8 is an end view of a modified form of the outer bushing element; and
FIGURE 9 is a view in elevation partly in section of the modified form of bushing element shown in FIGURE 8.

Referring to the drawing, the invention resides in raceway or conduit connector of resilient plastic such as a polyamide, for example, generally indicated at 10, which comprises a male member in the form of sleeve 12, having an inclined shoulder or tapered end portion 14, with a straight bore 16, therethrough, and a female member in the form of a bushing 18, having a straight bore 20, therethrough adapted to freely receive the sleeve 12 therein.

As best shown in FIGURES 1 and 2, the bushing 18 is provided adjacent one end thereof with a rectangular annular groove 22, adapted to receive the defining peripheral edge of an opening 24, provided therefor in a panel, chassis, frame, or the like 26. To facilitate the snap-action insertion of the bushing 18 into a suitable panel opening 24, the outer diameter of the opposite end portion 28 of the bushing 18 is tapered from said opposite end to the annular groove 22, and also provided with an annular recess 30, which extends axially inwardly from its tapered end face to a point substantially under the annular groove 22, whereby the inner diametral hub portion 32, of the bushing 18, is partially separated from its outer diametral portion 28. As best shown in FIGURE 2, the tapered portion 28 of the bushing 18 is divided into a plurality of independently yieldable fingers 34 by means of a plurality of angularly spaced, open ended parallel slots 36, to permit the free yielding or flexing of the tapered outer portion 28 of the bushing 18 in response to it being inserted into a suitably apertured panel 26.

In the connection of a pliable hose-like conduit 38 of vinyl plastic to a suitably apertured panel 26, by means of the raceway or conduit connector, generally indicated at 10, the two assembly steps indicated in FIGURE 2 are followed. Accordingly, the bushing 18 is passed over a desired section of the pliable conduit 38 in the direction indicated by the arrow A in FIGURE 2 to a point over one end thereof, and the sleeve 12 moved in the direction indicated by the arrow B, and forced into the open end of the conduit 38, whereby the end portion 40 of the conduit 38 is forced over the inclined shoulder or tapered end potrion 14, of the sleeve 12, and securely wedged between the outer periphery of the sleeve 12 and the inner periphery of the bushing 18, passage of the sleeve supported end portion of the conduit 38, into the bushing 18 being limited by the inclined shoulder 14, as clearly shown in FIGURE 1. As thus assembled, the improved connector fitting 10 is adapted to be inserted or readily forced into the opening 24 provided therefor in a panel or the like 26, and so held in place by co-action of its annularly grooved, yieldable finger portions 34, with the defining peripheral edge of the panel opening 24.

While the bushing 18, shown in FIGURES 1 through 7, is highly satisfactory for the purpose for which it is intended, a modification thereof as shown in FIGURES 8 and 9 may also be utilized in place thereof wherein the bushing 18 is provided with two concentric bores 42 and 44, respectively, the bore 42 in the end portion 46 of the bushing 18 being a large clearance bore, and the smaller bore 44 in its opposite end portion 48 adapted for receiving the sleeve 12, in telescopic relation with an end portion 40 of the pliable plastic conduit 38, frictionally received concentrically therebetween after the manner exemplified in FIGURE 1.

As in the preceding figures, the insertable end portion 46 of the bushing 18, in FIGURE 9, is also externally tapered and provided with an annular, rectangular groove 50 about its outer periphery substantially intermediate the respective ends of the bushing 18. Moreover, the tapered portion 46, is also divided into a plurality of independently yieldable finger portions 52, by means of a plurality of angularly spaced, open ended parallel slots 54, to permit the free, selective yielding or flexing of the tapered portion 46 of the bushing 18, in response to the forced insertion thereof into an apertured panel 26.

From the foreging description it will be readily apparent that the invention provides a pliable plastic connector fitting whereby tubular, hose-like conduits of pliable plastic may be utilized as electrical raceways in inter-connecting, for example, a plurality of individual units in electronic business machine installations in place of the laced conductor harness assemblies as used heretofore.

While the invention has been illustrated and described with respect to a preferred embodiment thereof, it is to be expressly understood that various changes and modifications may be made therein without departing from the inventive concept underlying the same. Therefore, the invention is not to be limited except as is necessitated by the prior art and the scope of the appended claim.

What is claimed is:

In an electrical raceway system, the combination of a tubular conduit of pliable plastic, a plastic sleeve having a narrow, angular shoulder about one end of its outer periphery disposed substantially in one end of said tubular conduit in frictional wall supporting relation, and a resilient bushing receiving said one end of said conduit and sleeve in telescopic relation therewith, said bushing having an annular groove adjacent one end thereof and a tapered opposite end portion having a recess between its inner and outer periphery, the outer peripheral portion of said tapered end portion being provided with a plurality of angularly spaced, open-ended parallel slots axially thereof to provide independent relatively flexible finger portions adapted to yield in response to forced insertion of said tapered end portion in an opening provided therefor in a panel member or the like and said annular groove adapted to receive the peripheral edge face defining said panel opening to secure said bushing, sleeve and conduit in place.

References Cited by the Examiner

UNITED STATES PATENTS

| | | | |
|---|---|---|---|
| 2,912,712 | 11/1959 | Shamban et al. | 16—2 |
| 2,947,800 | 8/1960 | Badeau et al. | 174—65 X |
| 3,114,969 | 12/1963 | Roth | 285—159 X |

FOREIGN PATENTS

| | | |
|---|---|---|
| 823,722 | 11/1959 | Great Britain. |
| 37,574 | 9/1914 | Sweden. |

ROBERT K. SCHAEFER, *Primary Examiner.*

LARAMIE E. ASKIN, *Examiner.*